United States Patent
Vinyals et al.

(10) Patent No.: US 10,409,908 B2
(45) Date of Patent: Sep. 10, 2019

(54) GENERATING PARSE TREES OF TEXT SEGMENTS USING NEURAL NETWORKS

(71) Applicant: Google LLC, Mountain View, CA (US)

(72) Inventors: Oriol Vinyals, Palo Alto, CA (US); Lukasz Mieczyslaw Kaiser, Mountain View, CA (US)

(73) Assignee: Google LLC, Mountain View, CA (US)

( * ) Notice: Subject to any disclaimer, the term of this patent is extended or adjusted under 35 U.S.C. 154(b) by 764 days.

(21) Appl. No.: 14/976,121

(22) Filed: Dec. 21, 2015

(65) Prior Publication Data

US 2016/0180215 A1 Jun. 23, 2016

Related U.S. Application Data

(60) Provisional application No. 62/094,858, filed on Dec. 19, 2014.

(51) Int. Cl.
*G06F 17/27* (2006.01)
*G06N 3/04* (2006.01)

(52) U.S. Cl.
CPC ....... *G06F 17/2705* (2013.01); *G06N 3/0445* (2013.01); *G06N 3/0454* (2013.01)

(58) Field of Classification Search
CPC .............................. G06N 3/088; G06F 17/2705
See application file for complete search history.

(56) References Cited

U.S. PATENT DOCUMENTS

2011/0301942 A1* 12/2011 Collobert .............. G06F 17/271 704/9
2015/0186504 A1* 7/2015 Gorman .............. G06F 17/2705 707/752

OTHER PUBLICATIONS

Cho et al, "On the Properties of Neural Machine Translation: Encoder-Decoder Approaches", Oct. 7, 2014, pp. 1-9.*
Graves et al., "Sequence Transduction with Recurrent Neural Networks,", Nov. 14, 2012, pp. 1-9.*
Cho et al., "Learning Phrase Representations using RNN Encoder—Decoder for Statistical Machine Translation", Sep. 3, 2014, pp. 1-15.*
Chorowski et al., "End-to-end Continuous Speech Recognition using Attention-based Recurrent NN: First Results", Dec. 4, 2014, Deep Learning and Representation Learning Workshop, NIPS 2014, pp. 1-10 (Year: 2014).*
Graves, "Generating Sequences With Recurrent Neural Networks", Jun. 5, 2014, pp. 1-43 (Year: 2014).*
Bandanau et al., "Neural machine translation by jointly learning to align and translate," arXiv preprint arXiv:1409.0473, pp. 1-15, 2014.

(Continued)

*Primary Examiner* — Kamran Afshar
*Assistant Examiner* — Brent Johnston Hoover
(74) *Attorney, Agent, or Firm* — Fish & Richardson P.C.

(57) ABSTRACT

Methods, systems, and apparatus, including computer programs encoded on computer storage media, for generating parse trees for input text segments. One of the methods includes obtaining an input text segment, processing the input text segment using a first long short term memory (LSTM) neural network to convert the input text segment into an alternative representation for the input text segment, and processing the alternative representation for the input text segment using a second LSTM neural network to generate a linearized representation of a parse tree for the input text segment.

19 Claims, 4 Drawing Sheets

(56) References Cited

OTHER PUBLICATIONS

Das et al., "Learning context-free grammars: Capabilities and limitations of a recurrent neural network with an external stack memory," In Proceedings of The Fourteenth Annual Conference of Cognitive Science Society, pp. 791-795, 1992.

Luong et al., "Addressing the rare word problem in neural machine translation," arXiv preprint arXiv:1410.8206, pp. 1-9, 2014.

Petrov and Klein, "Improved Inference for Unlexicalized Parsing," in Proceedings of NAACL HLT 2007, vol. 7, pp. 404-411, Apr. 2007.

Petrov et al., "Learning Accurate, Compact, and Interpretable Tree Annotation," ACL-44 Proceedings of the 21st International Conference on Computational Linguistics and the 44th annual meeting of the Association for Computational Linguistics, pp. 433-440, Jul. 2006.

Sutskever et al. "Sequence to sequence learning with neural networks," In Advances in Neural Information Processing Systems, pp. 3104-3112, 2014.

\* cited by examiner

GENERATING PARSE TREES OF TEXT SEGMENTS USING NEURAL NETWORKS

CROSS-REFERENCE TO RELATED APPLICATION

This application claims priority to U.S. Provisional Application No. 62/094,858, filed on Dec. 19, 2014. The disclosure of the prior application is considered part of and is incorporated by reference in the disclosure of this application.

BACKGROUND

This specification relates to generating parse trees for text segments using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can generate a parse tree for an input text segment using long short-term memory (LSTM) neural networks. Generally, the parse tree is a tree that represents the syntactic structure of the text segment according to a context-free grammar.

In general, one innovative aspect of the subject matter described in this specification can be embodied in methods that include the actions of obtaining an input text segment; processing the input text segment using a first long short term memory (LSTM) neural network to convert the input text segment into an alternative representation for the input text segment; and processing the alternative representation for the input text segment using a second LSTM neural network to generate a linearized representation of a parse tree for the input text segment.

The foregoing and other embodiments can each optionally include one or more of the following features, alone or in combination.

The method may comprise generating the parse tree for the input text segment from the linearized representation of the parse tree.

The linearized representation of the parse tree for the input text segment may be a sequence of symbols from a predetermined vocabulary of parse tree symbols.

The input text segment may be a variable length input text segment.

The alternative representation may be a vector of fixed dimensionality.

Processing the input text segment may comprise adding an end-of-sentence token to the end of the input text segment to generate a modified input text segment; and processing the modified input text segment using the first LSTM neural network.

Processing the alternative representation for the input text segment using the second LSTM neural network may comprise initializing a hidden state of the second LSTM neural network to the alternative representation for the input text segment.

Processing the alternative representation for the input text segment using the second LSTM neural network may comprise: processing the alternative representation for the input text segment using the second LSTM neural network to generate a respective sequence score for each of a plurality of possible linearized representations of parse trees; and selecting a possible linearized representation having a highest sequence score as the linearized representation of the parse tree for the input text segment.

Processing the alternative representation for the input text segment using the second LSTM neural network to generate a respective sequence score for each of a plurality of possible linearized representations of parse trees may comprise: processing the alternative representation using the second LSTM neural network using a left to right beam search decoding.

The set of possible linearized representations may comprise possible linearized representations of varying lengths.

The method may further comprise training the first LSTM neural network and the second LSTM neural network using Stochastic Gradient Descent.

One or more of the first LSTM neural network or the second LSTM neural network may be a deep LSTM neural network.

The parse tree may be a tree that represents the syntactic structure of the text segment according to a context-free grammar, and a linearized representation of a particular parse tree may be generated by traversing the particular parse tree in a depth-first traversal order.

Particular embodiments of the subject matter described in this specification can be implemented so as to realize one or more of the following advantages. Neural networks can be effectively used for a syntactic constituency parsing task, even though this task requires modeling complex relations between input words and producing trees as the output. LSTM neural networks are able to automatically learn the complex syntactic relationships between the input and output pairs, which had typically been manually engineered into prior parsing models. In particular, parse trees can be generated without binarizing the parse trees or using any special handling for unary productions or unknown words, which are simply mapped to a single unknown word token.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
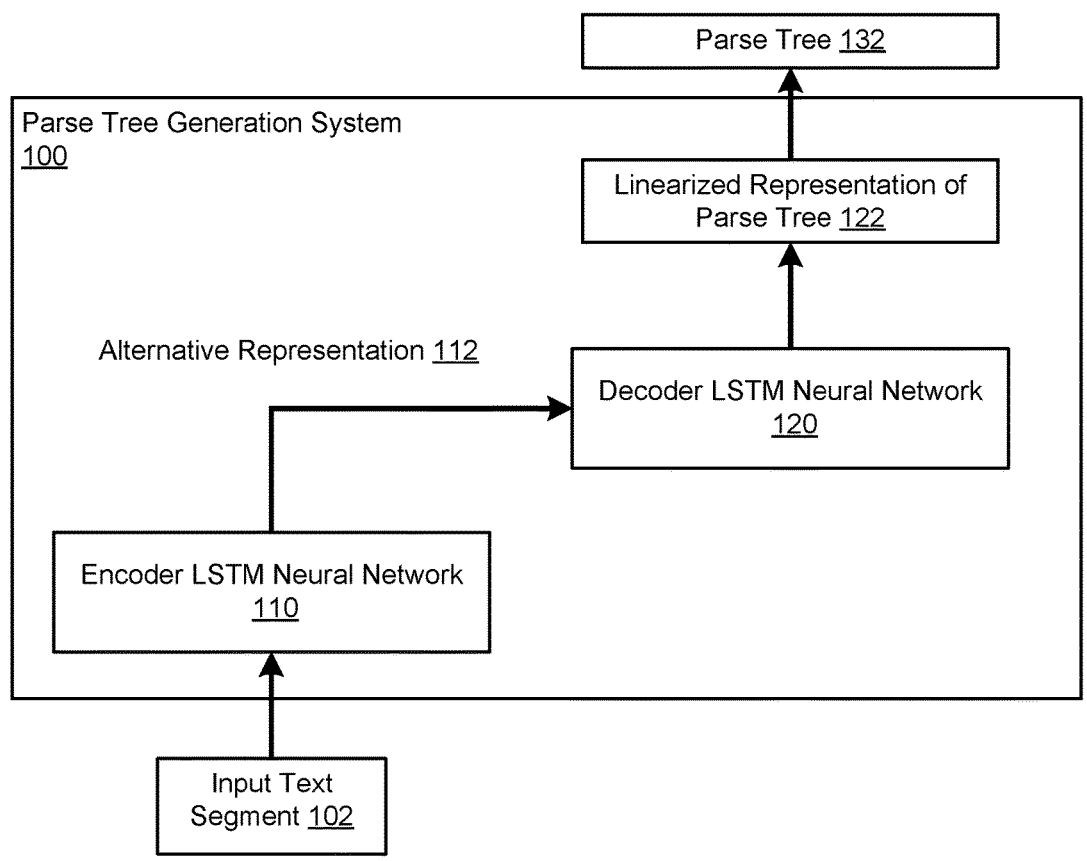
FIG. 1 shows an example parse tree generation system.

FIG. 1 shows an example parse tree generation system 100. The parse tree generation system 100 is an example of a system implemented as computer programs on one or more computers in one or more locations, in which the systems, components, and techniques described below can be implemented.

The parse tree generation system 100 receives input text segments and generates a parse tree for each input text segment. Each input text segment is a sequence of words and, optionally, punctuation marks in a particular natural language, e.g., a sentence, a sentence fragment, or another multi-word sequence. The parse tree is a tree that represents the syntactic structure of the text segment according to a context-free grammar. For example, the parse tree generation system 100 can receive an input text segment 102 and generate a parse tree 132 for the input text segment 102. Generally, the input text segments obtained by the parse tree generation system 100 can be sequences of varying lengths. That is, the parse tree generation system 100 can be configured to receive text segments that have varying numbers of words and punctuation marks.

The parse tree generation system 100 includes an encoder long short-term memory (LSTM) neural network 110 and a decoder LSTM neural network 120.

As part of generating a parse tree from an input text segment, the parse tree generation system 100 processes the input text segment using the encoder LSTM neural network 110 to generate an alternative representation for the input text segment, e.g., an alternative representation 112 for the input text segment 102.

The encoder LSTM neural network 110 is a recurrent neural network that receives an input text segment and generates an alternative representation from the input text segment. In particular, the encoder LSTM neural network 110 is an LSTM neural network that includes one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network 110. An example LSTM neural network is described in more detail in "Generating sequences with recurrent neural networks," Alex Graves. In some implementations, the encoder LSTM neural network is a deep LSTM neural network.

The encoder LSTM neural network 110 has been configured, e.g., through training, to process each word in a given input text segment to generate the alternative representation of the input text segment in accordance with a set of parameters. In particular, the encoder LSTM neural network 110 is configured to receive each word in the input text segment in the input order and, for a given received input, to update the current hidden state of the encoder LSTM neural network 110 by processing the received input, i.e., to modify the current hidden state of the encoder LSTM neural network 110 that has been generated by processing previous inputs from the input text segment by processing the current received input.

Generating an alternative representation using the encoder LSTM neural network is described in more detail below with reference to FIG. 2.

The parse tree generation system 100 processes the generated alternative representation of the input text segment using the decoder LSTM neural network 120 to generate a linearized representation of the parse tree for the input text segment. For example, the parse tree generation system 100 can process the alternative representation 112 using the decoder LSTM neural network 120 to generate the linearized representation 122 for the input text segment 102. A linearized representation of a parse tree is a sequence of symbols from a pre-determined vocabulary of parse tree symbols that collectively represents the parse tree. In particular, the vocabulary of parse tree symbols includes symbols that represent a portion of a parse tree, e.g., part of speech tags, symbols that determine hierarchical relationships between other symbols in the sequence, and so on. A linearized representation can be generated from a parse tree by adding the symbols in the parse tree to the sequence in depth-first traversal order.

The decoder LSTM neural network 120 is an LSTM neural network that includes one or more LSTM layers and that is configured receive a current output in a linearized representation and to generate a respective output score for each of a set of possible outputs from the current output and in accordance with the current hidden state of the decoder LSTM neural network 120 and current values of a set of parameters. In some implementations, the decoder LSTM neural network is a deep LSTM neural network. The output score for a given output represents the likelihood that the output is the next output in the linearized representation, i.e., that the output immediately follows the current output in the linearized representation. As part of generating the output scores, the decoder LSTM neural network 120 also updates the hidden state of the network to generate an updated hidden state. In some implementations, the decoder LSTM neural network also receives, along with the current output, the word or punctuation mark from the input text segment that is currently on the top of a maintained stack of words and punctuation marks from the input text segment.

The set of possible outputs includes the symbols from the vocabulary of parse tree symbols and a designated end-of-sentence token. The end-of-sentence token is a designated output that is not in the vocabulary of possible parse tree symbols.

Processing an alternative representation using the decoder LSTM neural network to generate a linearized representation is described in more detail below with reference to FIGS. 2 and 3.

Figure 2:
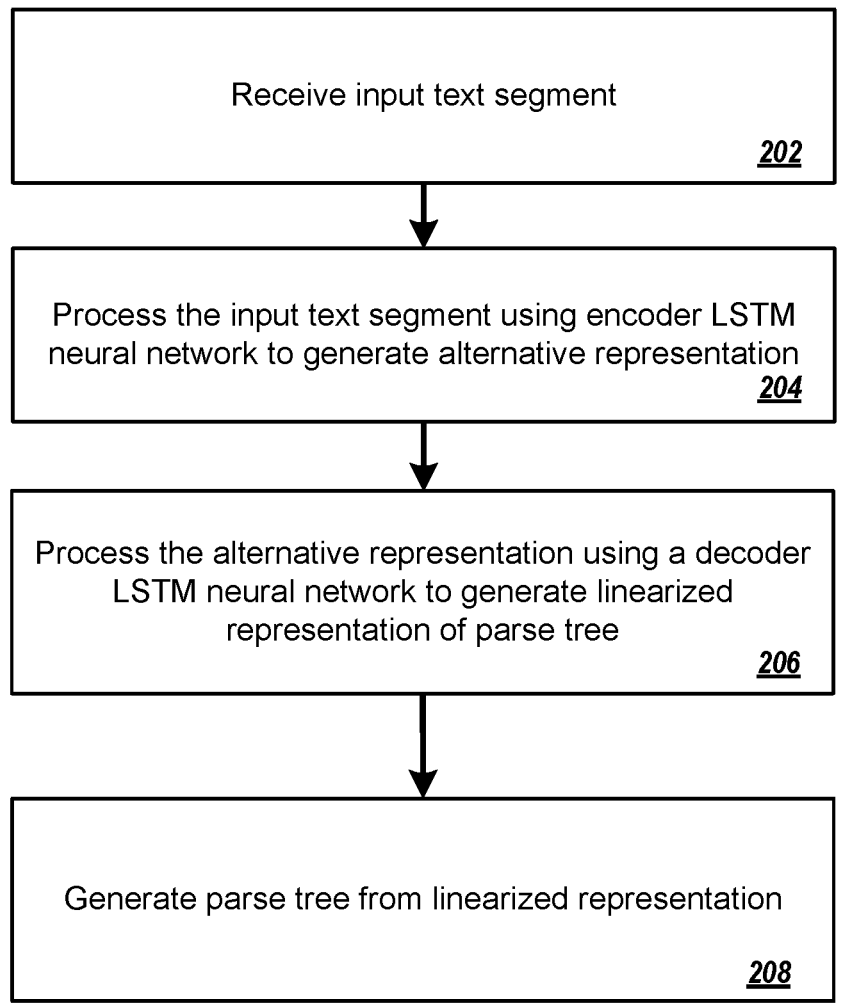
FIG. 2 is a flow diagram of generating a parse tree for an input text segment.

FIG. 2 is a flow diagram of an example process 200 for generating a parse tree from an input text segment. For convenience, the process 200 will be described as being performed by a system of one or more computers located in one or more locations. For example, a parse tree generation system, e.g., the parse tree generation system 100 of FIG. 1, appropriately programmed, can perform the process 200.

The system obtains an input text segment (step 202). The input text segment includes a set of inputs, i.e., words and, optionally, punctuation marks, arranged according to an input order.

The system processes the input text segment using an encoder LSTM neural network, e.g., the encoder LSTM neural network 110 of FIG. 1, to convert the input text segment into an alternative representation for the input text segment (step 204).

As part of processing the input text segment, the system modifies the input text segment to insert the end-of-sentence token or a different designated token at the end of the input text segment, i.e., after the input in the last position of the input order, to generate a modified input text segment. The designated token is a designated input that is not in a vocabulary of possible inputs that may be included in input text segments processed by the system and, if the designated token is the end-of-sentence token, is also not in the vocabulary of possible outputs.

The system then processes each input in the modified input text segment using the encoder LSTM neural network to generate the alternative representation for the input text segment. In particular, the system generates the alternative representation from the hidden state of the encoder LSTM neural network. For example, the alternative representation may be the hidden state of the encoder LSTM after the designated token at the end of the input text segment has been processed, i.e., the last hidden state of the encoder LSTM. Thus, because the system generates the alternative representation from the hidden state of the encoder LSTM neural network, the alternative representation of the input text segment is a fixed-length representation, i.e., the number of elements in the alternative representation is fixed and is not dependent on the number of inputs in the input text segment. For example, the LSTM hidden state and, accordingly, the alternative representation may be a vector of numeric values that has a fixed dimensionality, e.g., a vector of floating point values or of quantized representations of floating point values.

The system processes the alternative representation using a decoder LSTM neural network, e.g., the decoder LSTM neural network 120 of FIG. 1, to generate a linearized representation of the parse tree for the input text segment (step 206). The linearized representation is a sequence of symbols from a pre-determined parse tree vocabulary arranged according to an output order.

Generally, the system processes the alternative representation using the decoder LSTM neural network by initializing an initial hidden state of the decoder LSTM to the alternative representation of the input text segment, i.e., setting the initial state hidden state equal to the alternative representation. Processing the alternative representation using the decoder LSTM neural network is described in more detail below with reference to FIGS. 3 and 4.

In some implementations, the linearized representation is the final output of the system, i.e., the system stores the linearized representation or provides the linearized representation for further processing by another system or for presentation to a user. In some other implementations, the system generates the parse tree from the linearized representation (step 208). The system can generate the parse tree from the linearized representation by decoding the parse tree symbols in the linearized representation to recover the tree structure of the parse tree.

Figure 3:
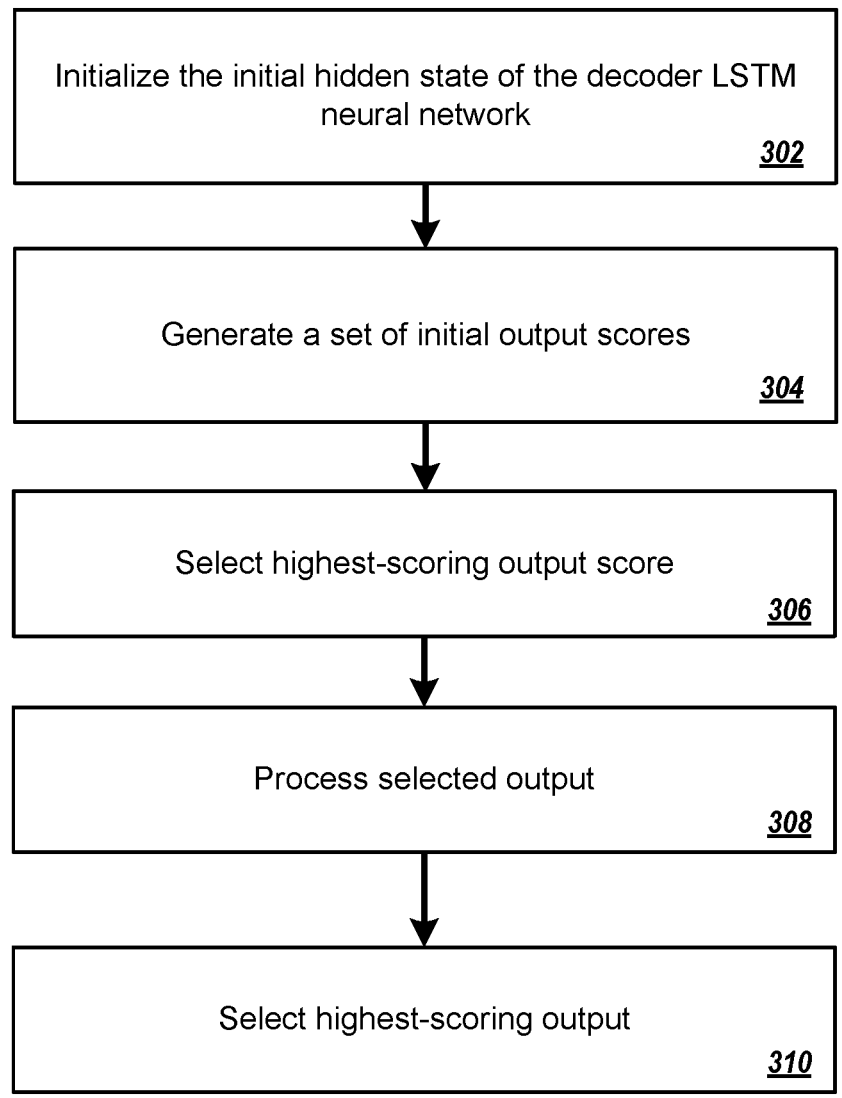
FIG. 3 is a flow diagram of an example process for generating a linearized representation using a decoder LSTM neural network.

FIG. 3 is a flow diagram of an example process 300 for generating a linearized representation using a decoder LSTM neural network. For convenience, the process 300 will be described as being performed by a system of one or more computers located in one or more locations. For example, a parse tree generation system, e.g., the parse tree generation system 100 of FIG. 1, appropriately programmed, can perform the process 300.

The system initializes the initial hidden state of the decoder LSTM neural network to the alternative representation of the input text segment (step 302). In some implementations, the system also initializes a stack that has the inputs in the text segment ordered according to the input order, so the first input in the text segment is initially on top of the stack.

The system generates a set of initial output scores using the decoder LSTM neural network in accordance with the initial hidden state (step 304). That is, the system processes an initial placeholder output using the decoder LSTM neural network in accordance with the initial hidden state to generate the initial output scores and to generate an updated hidden state using the initial hidden state. In implementations where the system maintains a stack, the system also includes the input that is on top of the stack as part of the input with the placeholder input.

The system selects a highest-scoring output according to the initial output scores as the first output in the linearized representation (step 306).

The system processes the selected output using the decoder LSTM neural network to generate a set of next output scores (step 308). That is, the system processes the selected output in accordance with the updated hidden state of the network to generate the set of next output scores and to again update the hidden state of the network. In implementations where the system maintains a stack, the system also determines whether to pop an input from the stack and then includes the input that is on top of the stack as part of the input with the selected output. The system determines to pop an input from the stack when the selected output is a predetermined stack control symbol in the vocabulary of parse tree symbols.

The system selects a highest-scoring output according to the next output scores as the next output in the linearized representation (step 310).

The system can repeat steps 308 and 310 to add outputs to the linearized representation and to update the hidden state of the network until the highest-scoring output is the end-of-sentence token rather than one of the outputs from the vocabulary of parse tree symbols. The system can then consider, as the linearized representation, the sequence of the selected outputs that were selected prior to the end-of-sentence token being the highest-scoring output.

In some implementations, the system generates multiple possible linearized representations and determines a respective sequence score for each possible linearized representation. The system can then select the possible linearized representation having the highest sequence score as the linearized representation. In particular, the system can generate the possible linearized representations by performing a beam search decoding using the decoder LSTM neural network.

Figure 4:
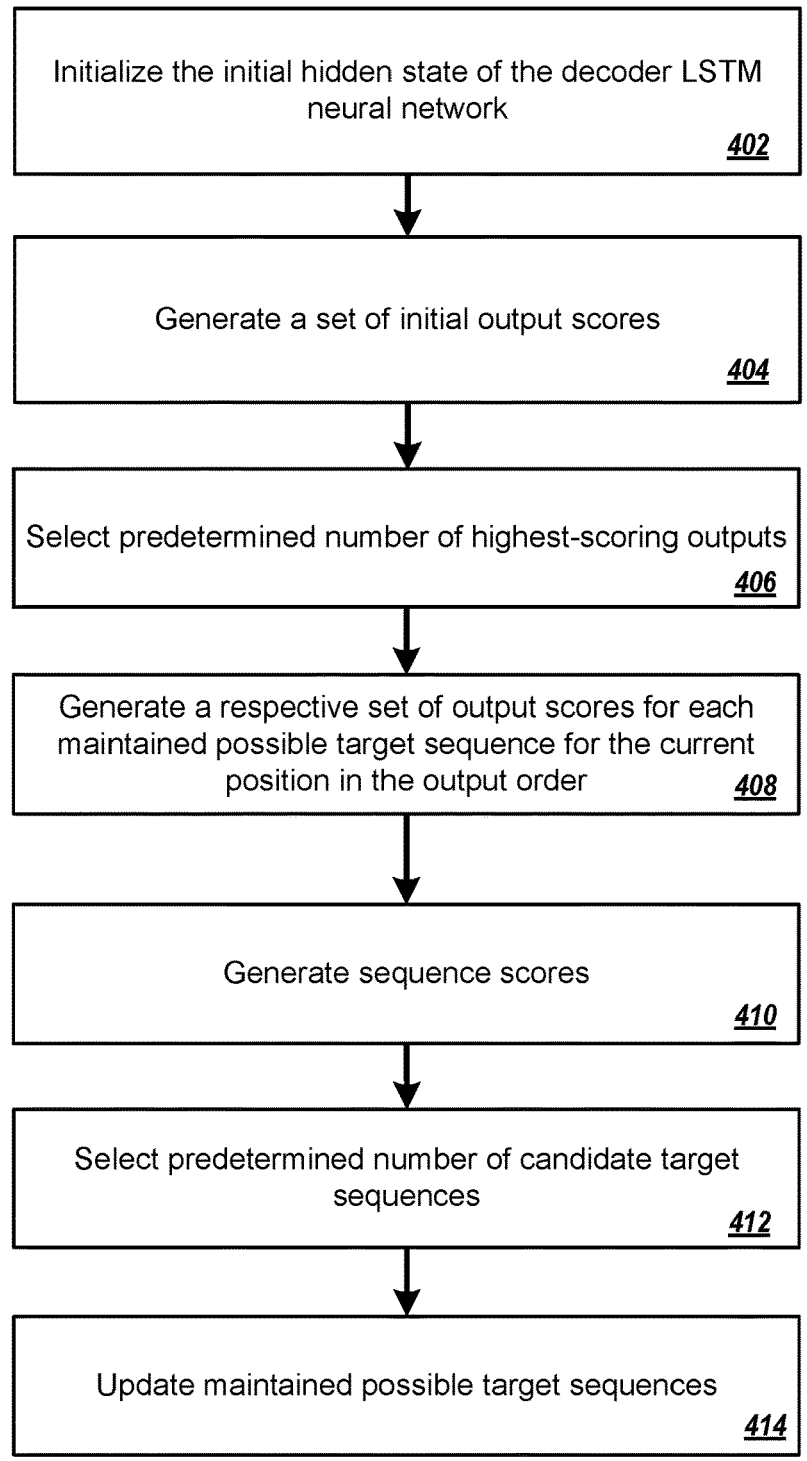
FIG. 4 is a flow diagram of an example process for performing a beam search decoding using a decoder LSTM neural network.

FIG. 4 is a flow diagram of an example process 400 for performing a beam search decoding using a decoder LSTM neural network. For convenience, the process 400 will be described as being performed by a system of one or more computers located in one or more locations. For example, a parse tree generation system, e.g., the parse tree generation system 100 of FIG. 1, appropriately programmed, can perform the process 400.

The system initializes the initial hidden state of the decoder LSTM neural network to the alternative representation of the input text segment (step 402).

The system generates the set of initial output scores using the decoder LSTM neural network in accordance with the initial hidden state (step 404).

The system selects a predetermined number of highest-scoring possible outputs according to the initial scores (step 406). The system generates a respective possible linearized representation for each selected possible output, each possible linearized representation including the corresponding selected possible output at the first position in the output order. The system associates the possible linearized representation with the initial score for the corresponding possible output as the sequence score for the possible linearized representation.

The system generates a respective set of output scores for each maintained possible linearized representation for the current position in the output order (step 408). That is, for each maintained possible linearized representation, the system processes the current output in the possible linearized representation and, optionally, the input currently on top of the stack, using the decoder LSTM neural network to generate a set of output scores in accordance with the current hidden state of the decoder LSTM neural network for the possible output sequence. The set of output scores includes a respective output score for each of the set of possible outputs. The system processes each maintained possible linearized representation independently from each other maintained possible linearized representation, so that the hidden state of the decoder LSTM used to generate the set of output scores for the current output in a given possible linearized representation is based only on the processing of the possible linearized representation and not on the selected outputs for any other possible linearized representation.

For example, once the system has selected the possible outputs for the first position in the output order, the system can process each of the selected first position outputs using the decoder LSTM neural network to generate a respective set of output scores for each selected first position output.

The system generates, for each maintained possible linearized representation, a respective sequence score for each possible candidate linearized representation that can be generated from the possible linearized representation (step 410). A candidate linearized representation for a given possible linearized representation is a sequence that appends one of the possible outputs to the end of the possible linearized representation. The sequence score for the candidate linearized representation is the sequence score for the possible linearized representation multiplied by the output score for the appended possible output.

The system selects the predetermined number of candidate linearized representations that have the highest sequence scores (step 412).

The system updates the maintained possible linearized representations to be the selected candidate linearized representations (step 414).

When a selected candidate linearized representation ends with the end-of-sentence token, the system removes the selected candidate linearized representation from the beam, i.e., stops adding additional outputs to the selected candidate linearized representation, and considers the selected candidate linearized representation prior to the end-of-sentence token being added to be a final possible linearized representation. The system also reduces the predetermined number of sequences to be maintained by one.

The system can repeat steps 408-414 of the process 400 until each maintained possible linearized representation has been finalized. The system can then select the final possible linearized representation having the highest sequence score as the linearized representation for the input text segment or can provide multiple ones of the final possible linearized representations as possible linearized representations for the input text segment.

In order to configure the encoder LSTM neural network and the decoder LSTM neural network, the system can train the networks using conventional machine learning training techniques, e.g., using Stochastic Gradient Descent with backpropagation through time. In particular, the system can train the networks jointly by backpropagating gradients computed for the decoder LSTM neural network back to the encoder LSTM neural network to adjust the values of the parameters of the encoder LSTM neural network during the training technique.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising: obtaining an input text segment; processing the input text segment using a first long short term memory (LSTM) neural network to convert the input text segment into an alternative representation for the input text segment; and processing the alternative representation for the input text segment using a second LSTM neural network to generate a linearized representation of a hierarchical parse tree for the input text segment, including using the second LSTM neural network to sequentially select symbols for the linearized representation, the selected symbols including (i) first symbols that represent syntactic elements of the input text segment and (ii) second symbols that represent hierarchical relationships between particular first symbols in the hierarchical parse tree.

2. The method of claim 1, further comprising: generating the hierarchical parse tree for the input text segment from the linearized representation of the hierarchical parse tree.

3. The method of claim 1, wherein the linearized representation of the hierarchical parse tree for the input text segment is a sequence of symbols from a predetermined vocabulary of parse tree symbols.

4. The method of claim 1, wherein the input text segment is a variable length input text segment.

5. The method of claim 1, wherein the alternative representation is a vector of fixed dimensionality.

6. The method of claim 1, wherein processing the input text segment comprises: adding an end-of-sentence token to the end of the input text segment to generate a modified input text segment; and processing the modified input text segment using the first LSTM neural network.

7. The method of claim 1, wherein processing the alternative representation for the input text segment using the second LSTM neural network comprises initializing a hidden state of the second LSTM neural network to the alternative representation for the input text segment.

8. The method of claim 1, wherein processing the alternative representation for the input text segment using the second LSTM neural network comprises: processing the alternative representation for the input text segment using the second LSTM neural network to generate a respective sequence score for each of a plurality of possible linearized representations of hierarchical parse trees; and selecting a possible linearized representation having a highest sequence score as the linearized representation of the hierarchical parse tree for the input text segment.

9. The method of claim 8, wherein processing the alternative representation for the input text segment using the second LSTM neural network to generate a respective sequence score for each of a plurality of possible linearized representations of hierarchical parse trees comprises: processing the alternative representation using the second LSTM neural network using a left to right beam search decoding.

10. The method of claim 8, wherein the set of possible linearized representations comprises possible linearized representations of varying lengths.

11. The method of claim 1, further comprising: training the first LSTM neural network and the second LSTM neural network using Stochastic Gradient Descent.

12. The method of claim 1, wherein one or more of the first LSTM neural network or the second LSTM neural network is a deep LSTM neural network.

13. The method of claim 1, wherein the hierarchical parse tree is a tree that represents the syntactic structure of the text segment according to a context-free grammar, and wherein a linearized representation of a particular hierarchical parse tree is generated by traversing the particular hierarchical parse tree in a depth-first traversal order.

14. The method of claim 1, comprising using the second LSTM neural network to sequentially select symbols for the linearized representation until an end-of-sentence token is selected that indicates the linearized representation is complete.

15. A system comprising one or more computers and one or more storage devices storing instructions that, when executed by the one or more computers, cause the one or more computers to perform operations comprising: obtaining an input text segment; processing the input text segment using a first long short term memory (LSTM) neural network to convert the input text segment into an alternative representation for the input text segment; and processing the alternative representation for the input text segment using a second LSTM neural network to generate a linearized representation of a hierarchical parse tree for the input text segment, including using the second LSTM neural network to sequentially select symbols for the linearized representation, the selected symbols including (i) first symbols that represent syntactic elements of the input text segment and (ii) second symbols that represent hierarchical relationships between particular first symbols in the hierarchical parse tree.

16. The system of claim 15, the operations further comprising: generating the hierarchical parse tree for the input text segment from the linearized representation of the hierarchical parse tree.

17. The system of claim 15, wherein the linearized representation of the hierarchical parse tree for the input text segment is a sequence of symbols from a predetermined vocabulary of parse tree symbols.

18. The system of claim 15, wherein processing the alternative representation for the input text segment using the second LSTM neural network comprises initializing a hidden state of the second LSTM neural network to the alternative representation for the input text segment.

19. A computer program product encoded on one or more non-transitory computer storage media, the computer program product comprising instruction that, when executed by one or more computers, cause the one or more computers to perform operations comprising: obtaining an input text segment; processing the input text segment using a first long short term memory (LSTM) neural network to convert the input text segment into an alternative representation for the input text segment; and processing the alternative representation for the input text segment using a second LSTM neural network to generate a linearized representation of a hierarchical parse tree for the input text segment, including using the second LSTM neural network to sequentially select symbols for the linearized representation, the selected symbols including (i) first symbols that represent syntactic elements of the input text segment and (ii) second symbols that represent hierarchical relationships between particular first symbols in the hierarchical parse tree.

* * * * *

UNITED STATES PATENT AND TRADEMARK OFFICE
CERTIFICATE OF CORRECTION

PATENT NO. : 10,409,908 B2  
APPLICATION NO. : 14/976121  
DATED : September 10, 2019  
INVENTOR(S) : Vinyals et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this  
Second Day of June, 2020

Andrei Iancu  
*Director of the United States Patent and Trademark Office*